United States Patent
Lam et al.

(10) Patent No.: US 6,813,658 B2
(45) Date of Patent: Nov. 2, 2004

(54) DYNAMIC DATA QUEUING MECHANISM FOR PACKET NETWORKS

(75) Inventors: Siu H Lam, Woodcliff Lake, NJ (US); Kai X Miao, Boonton Township, NJ (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 10/108,090

(22) Filed: Mar. 27, 2002

(65) Prior Publication Data

US 2003/0188057 A1 Oct. 2, 2003

(51) Int. Cl.[7] .................................................. G06F 3/00
(52) U.S. Cl. .......................... 710/54; 710/310; 710/52; 711/109; 711/110
(58) Field of Search ............................. 710/54, 52, 310; 370/414, 413; 711/110, 154, 109

(56) References Cited

U.S. PATENT DOCUMENTS

| | | | | |
|---|---|---|---|---|
| 5,873,089 A | * | 2/1999 | Regache | 707/100 |
| 5,925,099 A | * | 7/1999 | Futral et al. | 709/204 |
| 6,609,161 B1 | * | 8/2003 | Young | 710/5 |
| 2003/0120886 A1 | * | 6/2003 | Moller et al. | 711/173 |

* cited by examiner

Primary Examiner—Kim Huynh
(74) Attorney, Agent, or Firm—Pillsbury Winthrop LLP

(57) ABSTRACT

A dynamic data queuing mechanism for network packets is disclosed. A three-dimensional coil may be expanded or contracted in length. In addition, the size of each loop of the three-dimensional coil may be adjusted. Moreover, simple circular queue and dynamic buffer management techniques are combined to implement circular queues that may be adjusted in size. Size adjustment, in turn, causes an entire queue either to expand or contract. Circular queue size is changed dynamically, without any copying or moving of queue data. This advantage is attained with little overhead added to conventional circular queues, and is useful in reducing memory requirements for simple circular queues by adjusting queue size as needs change. This is particularly useful for multiple queues that share the same memory space.

11 Claims, 6 Drawing Sheets

DYNAMIC DATA QUEUING MECHANISM FOR PACKET NETWORKS

BACKGROUND

1. Field of the Invention

Embodiments described herein are directed to a dynamic data queuing mechanism for packet networks. Specifically, a three-dimensional coil can expand or contract in length. In addition, the size of each loop of the coil may be adjusted such that circular queue size may be increased or decreased.

2. Related Art

Simple circular queues form a common method of buffering data. A circular queue consists of an input pointer and an output pointer that are incremented each time a data element is processed, in a first-in/first-out ("FIFO") manner. Upon reaching the end of a queue, the pointers wrap around to the beginning again.

Since circular queues do not require maintenance of linked lists or memory allocation because of their fixed sizes, they are especially useful in time sensitive applications. A disadvantage of circular queues is that they are not memory efficient, in that the space allocated to the queues is not dynamically changeable.

U.S. Pat. No. 6,145,061, issued Nov. 7, 2000, and entitled "Method of Management of a Circular Queue for Asynchronous Access" discloses the use of a marker within queue data so as to allow sharing of circular queues by multiple processing threads as well as changing of queue size. This method adds to the operations needed in the queue input/output functions and thus affects their performance. Moreover, when queue sizes change, data copying becomes required.

A method that allows the space allocated for circular queues to be increased or decreased during normal operation, without subtracting from the efficiency of queuing and de-queuing data is thus a well-needed improvement in the field.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

The following paragraphs describe a dynamic data queuing mechanism for packet networks. A circular queue is a data structure similar to a queue except that it is linked at the rear to the front to form a circle. Circular queues constitute a common method of buffering data. Circular queues are especially useful for storing data that is cyclical.

A circular queue usually consists of an array that contains the items in the queue, two array indices, and an optional length. The indices are generally referred to as the head/input and tail/output pointers. A circular queue wraps around the end of an array when either its head/input pointer or its tail/output pointer wraps around the end.

Figure 1A:
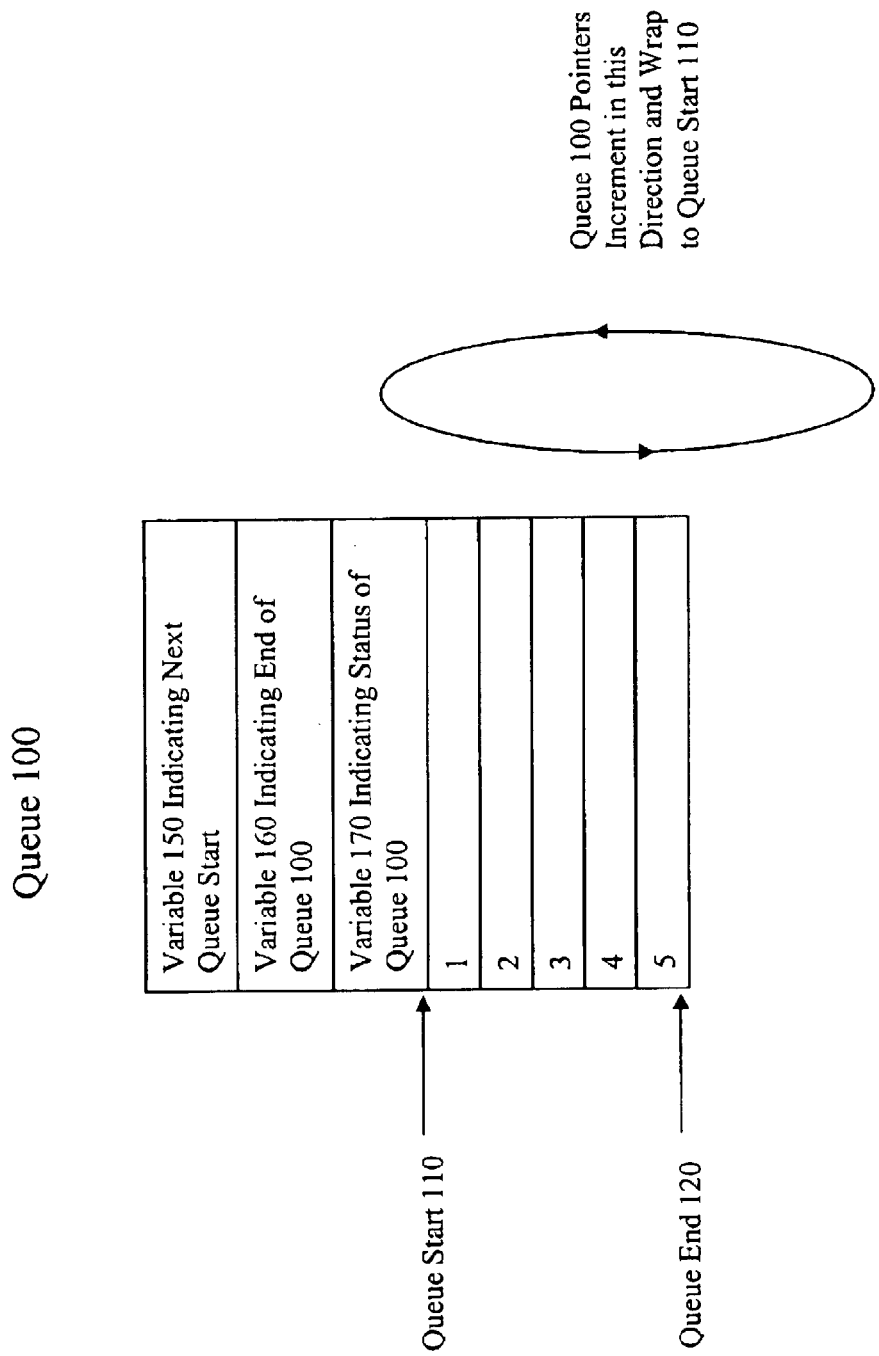
FIG. 1A is a diagram of a first circular queue with variables added to its beginning, according to an embodiment of the present invention.
Figure 1B:
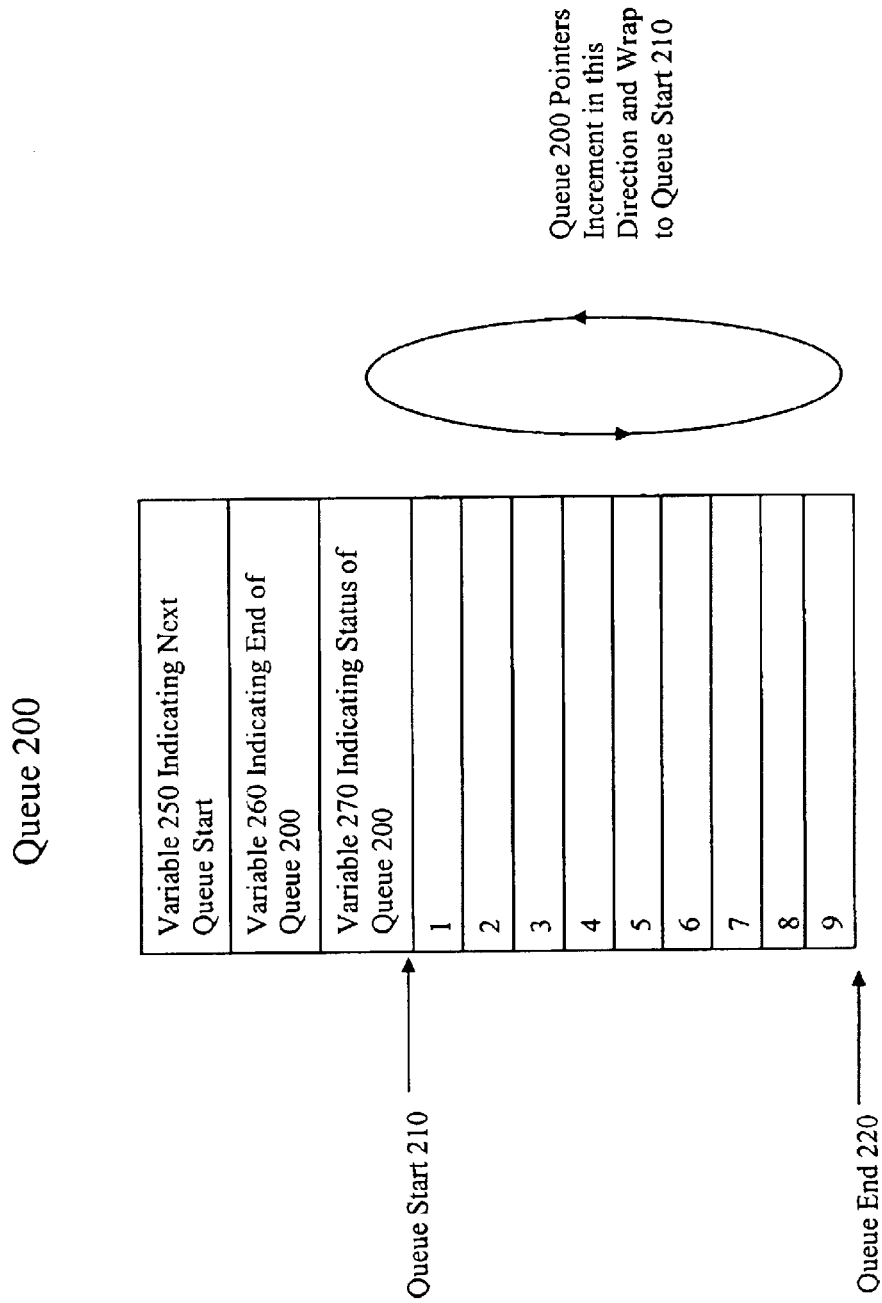
FIG. 1B is a diagram of a second circular queue with variables added to its beginning, according to an embodiment of the present invention.
Figure 1C:
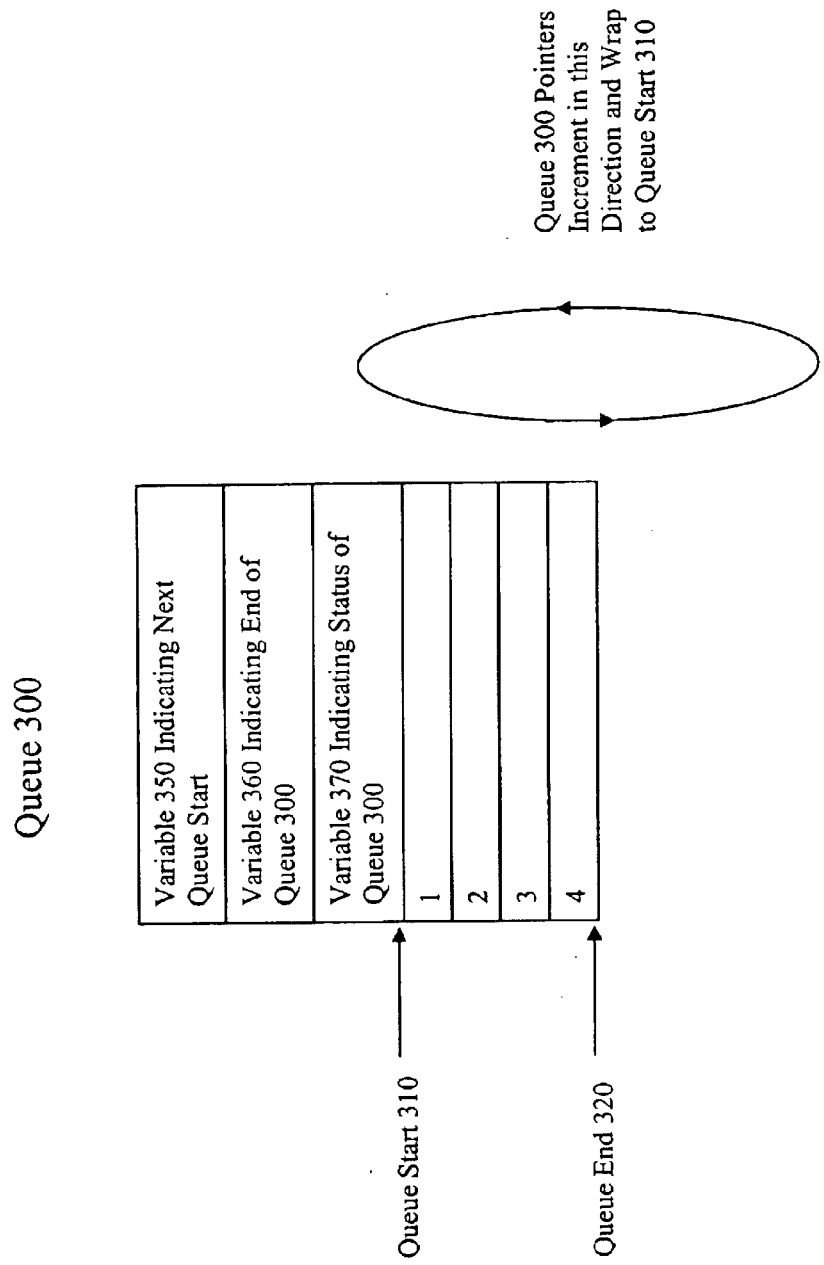
FIG. 1C is a diagram of a third circular queue with variables added to its beginning, according to an embodiment of the present invention.

Referring to FIGS. 1A, 1B, and 1C circular queue 100, circular queue 200, and circular queue 300 are each comprised of an input pointer and an output pointer that are incremented each time that a data element is processed, in a first-in/first-out ("FIFO") manner. The FIFO method is used for real-time packet processing to more readily keep time ordering. Upon reaching the end of a circular queue area, the pointers wrap around to the beginning again. As such, circular queue 100 pointers wrap around to queue start 110, while circular queue 200 pointers wrap around to queue start 210, and circular queue 300 pointers wrap around to queue start 310. The input pointers point to the first data element in their respective circular queue. The output pointers point slightly beyond the last data element in their respective queue.

To allow circular queue 100, circular queue 200, and circular queue 300 to be adjusted in size, several variables are added to the beginning of circular queue 100, circular queue 200, and circular queue 300. A first variable 150, 250, or 350, respectively, indicates the location of the start of the next circular queue. A second variable 160, 260, or 360, respectively, indicates the end of the current circular queue 100, 200, or 300. A third variable 170, 270, or 370, respectively, indicates the status of the circular queue 100, 200, or 300. At the start of the circular queue 100, for example, the start location of the next circular queue points to the start 110 of the current circular queue 100. At the start of the circular queue 200, the start location of the next circular queue points to the start 210 of the current circular queue 200. Similarly, at the start of the circular queue 300, for example, the start location of the next circular queue points to the start 310 of the current circular queue 300.

Figure 2:
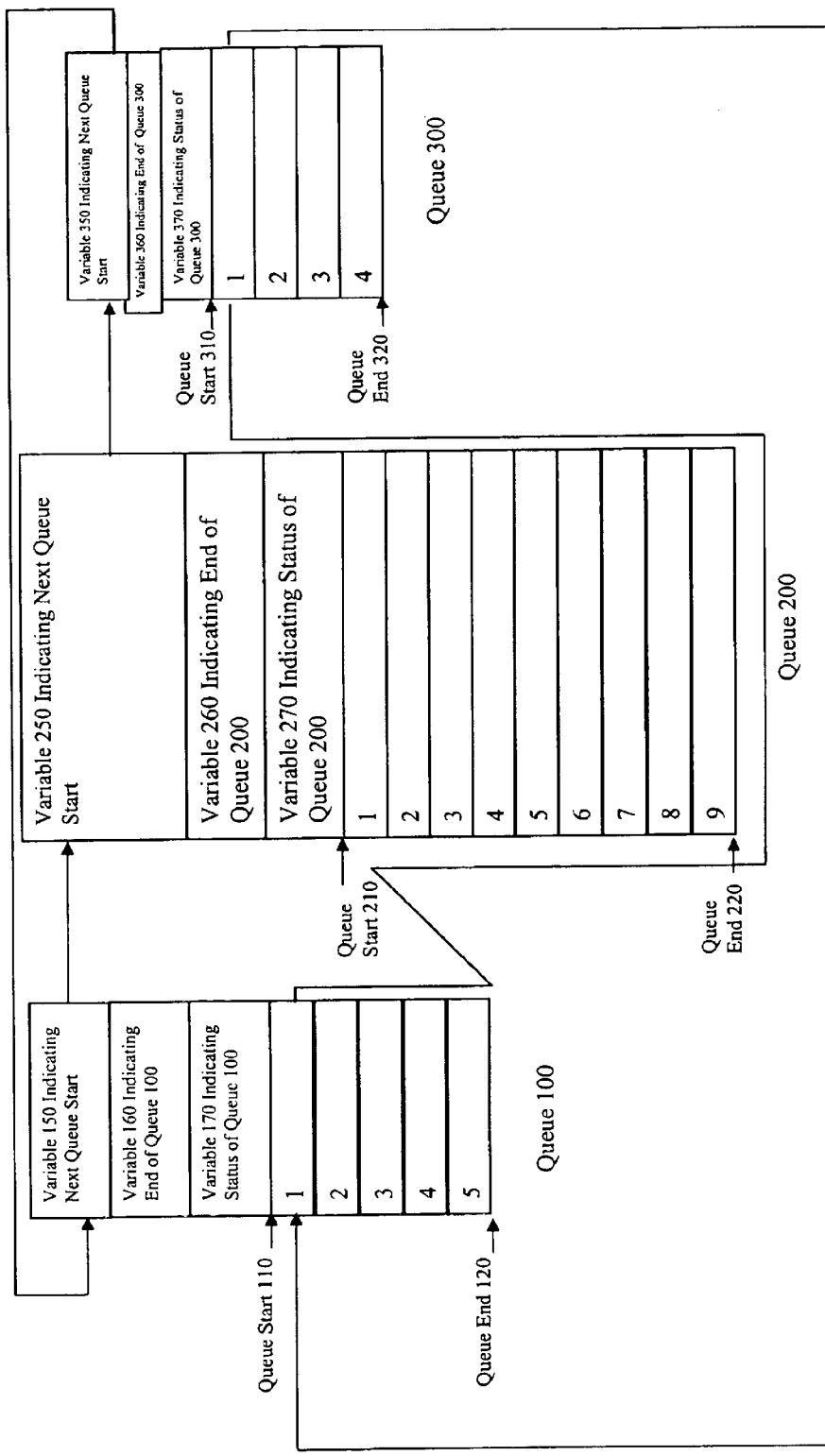
FIG. 2 is a diagram of additional circular queues concatenated to an original circular queue, according to an embodiment of the present invention.

As shown in FIG. 2, if more queue space is needed, circular queues 100, 200, and 300 may be chained together in separate blocks in memory. Using three queues is for illustration purposes only. In reality, many more queues may be used as need arises. That is, the number of queues dynamically increases or decreases depending on network traffic. The added space is concatenated to the original circular queue 100 by changing its next queue start to point to the new queue 200. The next queue start of circular queue 200 points to the new circular queue 300. The next queue start of the third circular queue 300 is set to point back to the original circular queue 100. In essence, in this expanded scenario, the queue pointer travels from one queue to another in a three-dimensional coil fashion. In this way, multiple circular queues of varying sizes may be concatenated together to create more space. Queues can also be dropped from the chain if less space is desired. That is, as the pointers traverse the circular queues 100, 200, and 300, the number of rungs in the coil indicative of expansion queues can be increased or decreased depending on need. Thus, these expansion queues can be dynamically allocated, de-allocated, or shared as needed.

To implement the coil, at the beginning a variable 160 indicating the current queue end is updated with the current queue end 120. As the queue input pointers and output pointers are incremented, they are compared with the current queue end 120. If the end of the queue is reached, the queue pointers will then be set to the next queue start 210 indicated at the start of the current queue. The current queue end 120 is also updated to the new queue 200. This allows the chaining of queues with negligible increase in overhead in both queuing and de-queuing functions. In essence, each circular queue 100, 200, and 300 contains the end of the current queue and a link or forwarding address of the start of the next circular queue to be used when the end of the current circular queue is reached. FIG. 2 depicts the flow from circular queue 100, to circular queue 200, to circular queue 300 and back to circular queue 100. A link can also point back to the current queue in which case a one-dimensional single queue system is implemented.

The adding of queue chains may be performed in the background as more or less space is detected to be required. The queuing and de-queuing functions only access the added chaining variables at the beginning of each queue when the end of a queue is reached. As such, contention for accessing these variables is not an issue.

Figure 3A:
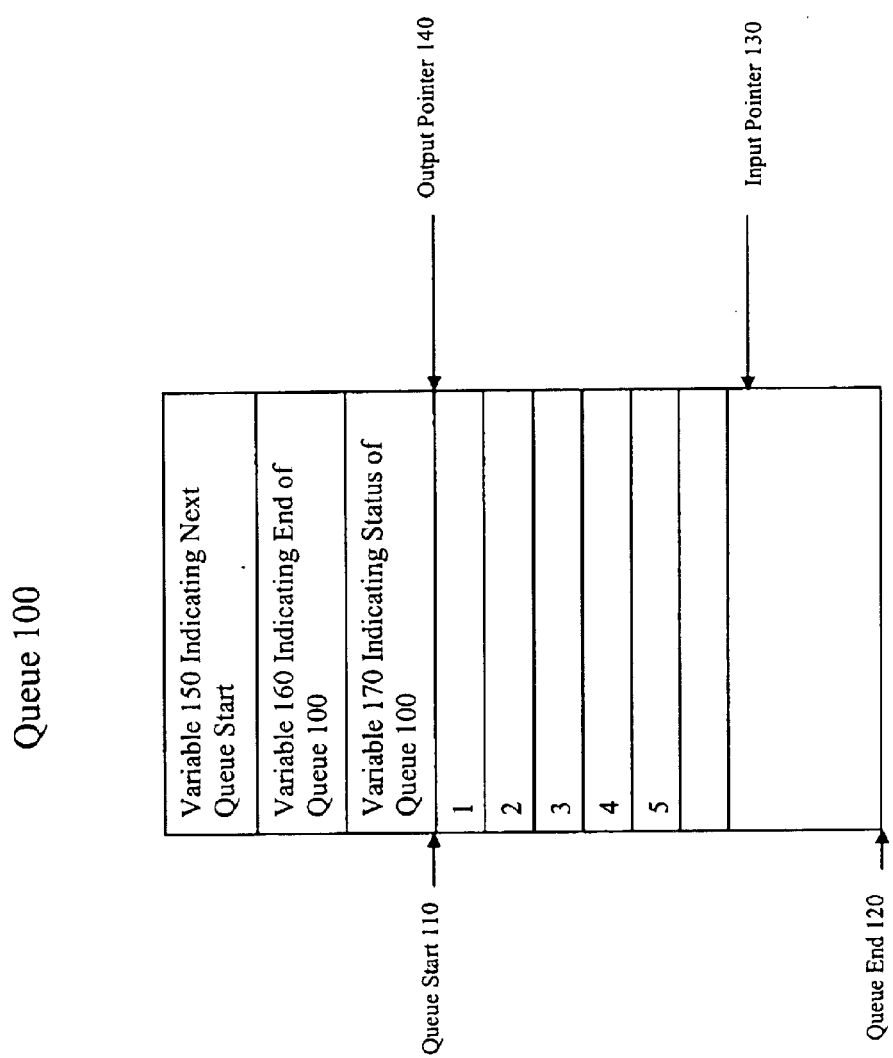
FIG. 3A is an illustration of an input pointer and an output pointer of a circular queue not straddling end points, according to an embodiment of the present invention.
Figure 3B:
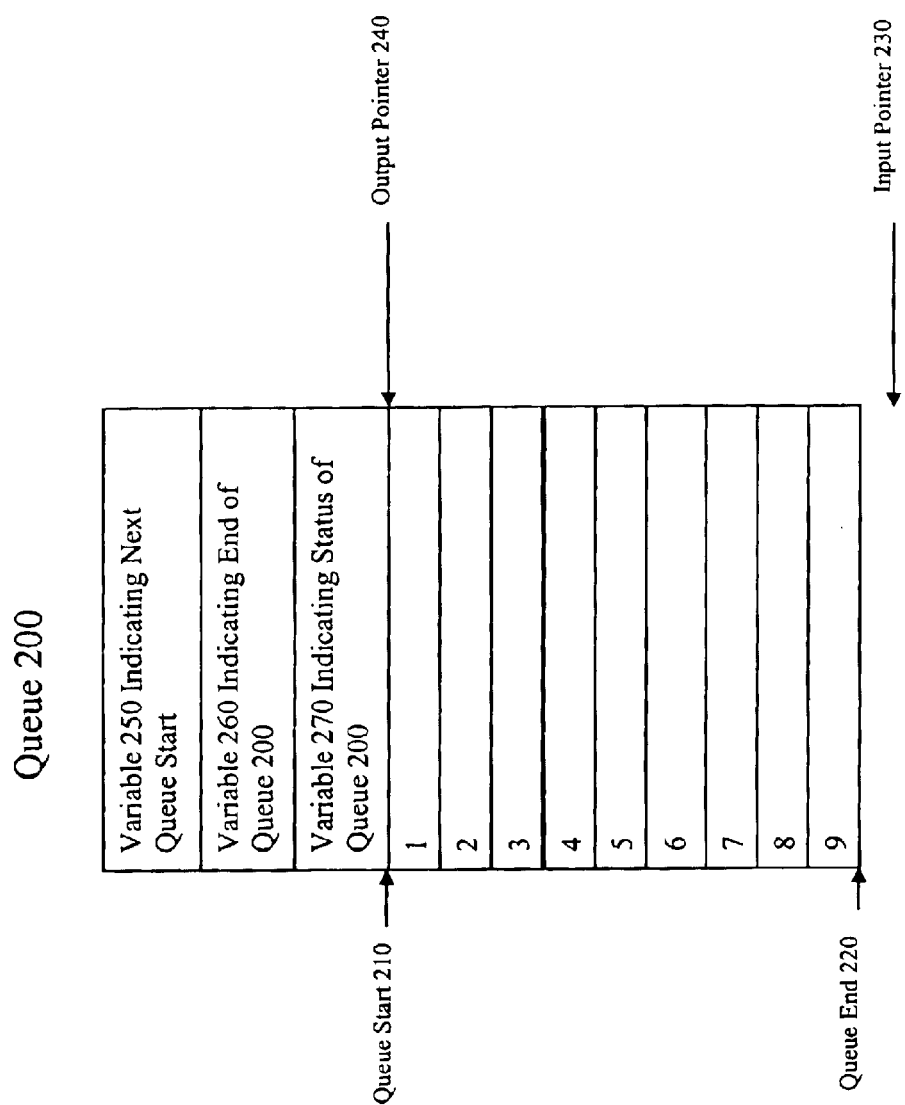
FIG. 3B is an illustration of an input pointer and an output pointer of a circular queue straddling end points, according to an embodiment of the present invention.

The adjustment of these variables, however, should take place when input and output pointers do not straddle endpoints. Otherwise, the input and output pointers will not be synchronized with respect to the queue variables. That is, the adjustment of circular queue 100, circular queue 200, and circular queue 300 should occur when the input and output pointers of circular queue 100, namely 130 and 140, and the input and output pointers of circular queue 200, namely 230 and 240, and the input and output pointers of circular queue 300 do not straddle queue end 120, queue end 220, and queue end 320. FIG. 3A illustrates a no straddling condition for circular queue 100. Input pointer 130 and output pointer 140 do not straddle circular queue end 120. FIG. 3B, in contrast, illustrates a straddling condition for circular queue 200 whereby input pointer 230 and output pointer 240 straddle queue end 220.

A simple mechanism is used to indicate the straddling condition. When an input pointer such as 130 or 230, for example, wraps around an end point, a first straddling flag or a second straddling flag, is set. The straddling flag number corresponds to the circular queue number. When an output pointer such as 140 or 240, for example, wraps around the end point, the corresponding straddling flag is reset. Straddling flags are stored as the status of each queue, and they are instrumental in determining whether circular queues may be adjusted.

If queues are to be removed from the chain, an additional condition must be checked in that the queue to be removed must not have either the current input or output pointer active within the current queue, thereby indicating that there is data in that particular queue.

An advantage to this mechanism is that the size of the circular queues may be changed dynamically, without copying or moving of queue data. This is attained with little overhead added to the conventional circular queues. The mechanism is particularly useful in reducing memory requirements for simple circular queues by adjusted queue sizes, as needs change. This is particularly useful for multiple queues sharing the same memory space.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A system of circular queues, comprising:
a plurality of queues 1 to n, where n is greater than or equal to 2, and wherein for i=1 to n−1, an end of a current queue i points to a start of a next queue i+1, and for i=n, an end of the current queue i points to the start of queue 1, wherein a first variable is added to each of the plurality of queues to indicate location of one of the start of the next queue and the start of queue 1, a second variable is added to each of the plurality of queues to indicate the end of each queue; and a third variable is added to each of the plurality of queues to indicate status of each queue.

2. The system of claim 1, wherein each of the plurality of queues has a start and an end.

3. The system of claim 2, wherein an input pointer and an output pointer traverse the plurality of queues, incrementing toward the end of each of the plurality of queues.

4. The system of claim 3, wherein adjustment of the first variable, the second variable, and the third variable occurs when the input pointers and the output pointers do not straddle endpoints.

5. The system of claim 4, wherein a straddling flag is set for each of the plurality of queues when the input pointer of the plurality of queues wraps around the end of each queue.

6. The system of claim 5, wherein the straddling flag for each of the plurality of queues is reset when the output pointer of the plurality of queues wraps around the end of each queue.

7. The system of claim 1, wherein each of the plurality of queues contains the end of the current queue and a forwarding address of the start of the next queue to be used when the end of the current queue is reached.

8. The system of claim 1, wherein at least one of the plurality of queues is eliminated if the input pointer and the output pointer of the at least one of the plurality of queues are inactive, indicating no data in the at least one of the plurality of queues.

9. The system of claim 1, wherein at least one queue is added to the plurality of queues as need arises, via concatenation to queue 1.

10. The system of claim 1, wherein the system functions to:
direct a queue pointer across the plurality of queues to create space;
compare an input pointer and an output pointer of the plurality of queues as they are incremented, against the current queue end; and
set the queue pointer to the next queue start or the first queue start, if the end of a queue is reached.

11. A system of circular queues, comprising:
a plurality of queues 1 to n, where n is at least three, and wherein for i=1 to n−1, an end of a current queue i points to a start of a next queue i+1, and for i=n, an end of the current queue i points to the start of queue 1, wherein a first variable is added to each of the plurality of queues to indicate location of one of the start of the next queue and the start of queue 1, a second variable is added to each of the plurality of queues to indicate the end of each queue; and a third variable is added to each of the plurality of queues to indicate status of each queue.

* * * * *